United States Patent
Zingg et al.

(10) Patent No.: US 10,092,130 B2
(45) Date of Patent: Oct. 9, 2018

(54) OPENER FOR MAKING LARGE OPENINGS IN CAPSULES

(71) Applicant: NESTEC S.A., Vevey (CH)

(72) Inventors: Sandro Zingg, Gasel (CH); Marc Moal, Jougne (FR)

(73) Assignee: Nestec S.A., Vevey (CH)

(*) Notice: Subject to any disclaimer, the term of this patent is extended or adjusted under 35 U.S.C. 154(b) by 153 days.

(21) Appl. No.: 14/441,428

(22) PCT Filed: Nov. 12, 2013

(86) PCT No.: PCT/EP2013/073530
§ 371 (c)(1),
(2) Date: May 7, 2015

(87) PCT Pub. No.: WO2014/076041
PCT Pub. Date: May 22, 2014

(65) Prior Publication Data
US 2015/0297017 A1    Oct. 22, 2015

(30) Foreign Application Priority Data
Nov. 12, 2012 (EP) .................................. 12192347

(51) Int. Cl.
*A47J 31/06* (2006.01)
*A47J 31/36* (2006.01)

(52) U.S. Cl.
CPC ................. *A47J 31/3628* (2013.01)

(58) Field of Classification Search
CPC .................... A47J 31/3628; A47J 31/3695
USPC .......... 99/295, 279, 302 R, 307, 323; 426/77, 426/115, 433
See application file for complete search history.

(56) References Cited

U.S. PATENT DOCUMENTS

| | | | |
|---|---|---|---|
| 6,880,454 B2 * | 4/2005 | Kollep | A47J 31/3695 99/295 |
| 8,393,261 B2 | 3/2013 | Kollep et al. | |
| 2012/0090473 A1 * | 4/2012 | Deuber | A47J 31/3695 99/289 R |

FOREIGN PATENT DOCUMENTS

| | | |
|---|---|---|
| EP | 1440638 | 7/2004 |
| EP | 1654966 | 5/2006 |
| WO | 0200073 | 1/2002 |
| WO | 2010118544 | 10/2010 |

\* cited by examiner

*Primary Examiner* — Dana Ross
*Assistant Examiner* — Joseph Iskra
(74) *Attorney, Agent, or Firm* — K&L Gates LLP

(57) ABSTRACT

A system comprises a capsule (30) with a wall and a capsule extraction unit (10,10', 20). The extraction unit has a capsule holder (20) for holding the capsule and an opener (10) with a cutting edge (151) for forming an opening (37,38) in the capsule wall (32,33) by cutting the wall. The opener (10,10') further comprises a ram (152) that recesses a portion (39) of the capsule wall (32,33) adjacent to the opening (37,38) after formation of the opening by cutting the wall (32,33) by the cutting edge (151).

22 Claims, 5 Drawing Sheets

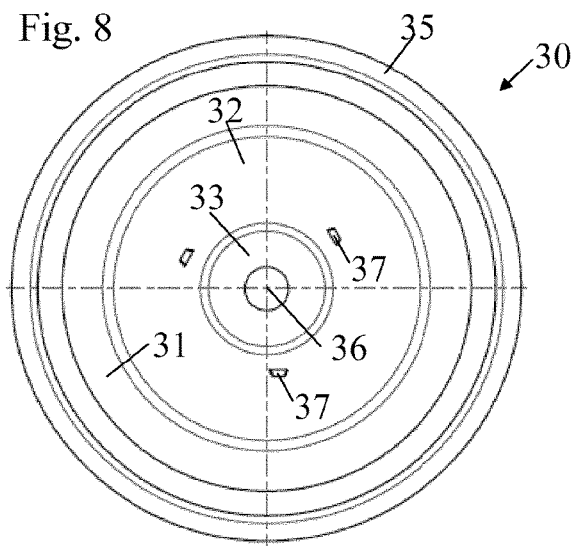
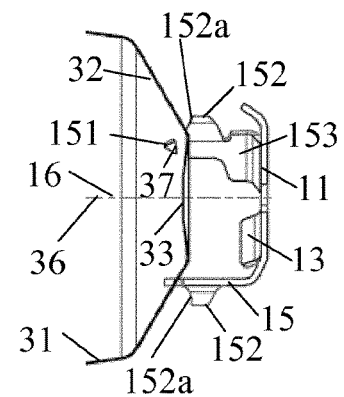
Fig. 8
Fig. 8a
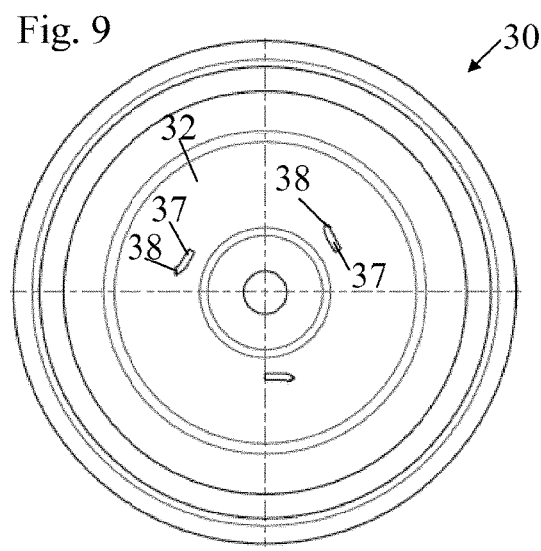
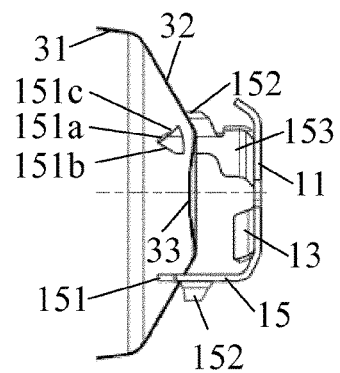
Fig. 9
Fig. 9a

OPENER FOR MAKING LARGE OPENINGS IN CAPSULES

CROSS REFERENCE TO RELATED APPLICATIONS

The present application is a National Stage of International Application No. PCT/EP2013/073530, filed on Nov. 12, 2013, which claims priority to European Patent Application No. 12192347.8, filed on Nov. 13, 2012, the entire contents of which are being incorporated herein by reference.

FIELD OF THE INVENTION

The present invention relates to a device for opening, e.g. piercing, and extracting a capsule as well as to a system of such a device and a capsule and to the use of a capsule for such a device. The device and the capsule may be used for preparing a beverage.

For the purpose of the present description, a "beverage" is meant to include any human-consumable liquid substance, such as tea, coffee, hot or cold chocolate, milk, soup, baby food, etc. . . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient.

TECHNICAL BACKGROUND

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like. Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Brewing devices have been developed to facilitate insertion of a "fresh" capsule and removal of the capsule upon use.

WO 2005/004683 and WO 2007/135136 relate to such brewing devices. The devices comprise a frame, a fixed holding part for the capsule, a movable holding part which is mounted relative to the frame in a sliding relationship, one or two knuckle joint mechanisms that provide a mechanical system which enables to close in a steady and fluid-tight manner the holding parts about the capsule while also resisting to the counter-force acting while re-opening and generated by the internal brewing pressure, and a handle for directly levering the knuckle joint mechanism. Such a device forms a simple assembly enabling insertion of the capsule by vertical fall through a passage in the frame and removal of the used capsule in the same direction as the insertion direction. The handle may serve to cover and uncover the passage for the capsule. The movable parts of the brewing device are actuated manually via the handle. The manual force required to move the movable parts varies during closure and opening of the machine and depends on the dimensional tolerances of the capsules used and the positioning and nature of the capsules as well as the temperature of the brewing unit. WO 2009/043630 discloses a beverage preparation machine including a brewing unit having a front part with a passage for inserting a capsule into the brewing unit. The front part is arranged to telescope out of the machine's housing for uncovering the passage for inserting a capsule into the brewing unit and telescopes into the brewing unit for sliding the passage under the housing and thus covering the passage by the housing. From a different approach, the actuation of the movable part of the brewing device may be motorized. EP 1 767 129 relates to a motor-driven extraction module for a capsule-based beverage production device. In this case, the user does not have to provide any manual effort to open or close the brewing device. WO 2012/025258 and WO 2012/025259 disclose other motorized machine for preparing beverages from ingredient capsules.

When the capsule containing the material to be extracted, e.g. a beverage ingredient, is partly or entirely sealed, in particular water and optionally air tight, it may be necessary to open the sealed capsule part by means of an appropriate opener. The opening may be delayed, i.e. during the extraction process of the capsule in the extraction unit e.g. as disclosed in EP 0 512 470 or in EP 2 068 684, or it may be carried out in the unit before extraction of the cartridge e.g. as disclosed in WO 02/00073 or in WO 02/35977. Further opening arrangements are disclosed in U.S. Pat. Nos. 3,260, 190, 5,649,472, CH 605 293, EP 512 468 and EP 242 556.

An extraction unit may typically include one or more blades for forming an opening in a capsule before extraction of the capsule. When a blade is used which does not itself include a liquid circulation duct, i.e. a duct for guiding liquid into or out from the capsule, the liquid normally circulates, outside and along the blade, into or out from the capsule in a passage formed inbetween the blade the boundaries of the opening formed in the capsule by the blade in the capsule. The passage formed between the blade and these boundaries may be too small for allowing the desired flow of liquid into or out of the capsule. As a result, the flow along the capsule may be too small, or the capsule may be torn in an unwanted manner about the boundaries (in the case of a pressurized outflow of liquid from the capsule) or the capsule may be crushed (in the case of a pressurized inflow or attempted inflow of liquid into the capsule).

This problem has been addressed in WO02/00073. An extraction unit is disclosed which includes several capsule piercing blades that pierce a capsule for allowing a circulating of liquid through the capsule. The blades have transverse though-openings that extend into a cartridge during extraction to provide an increased space along the blade so as to facilitate introduction of liquid from outside into the cartridge.

The presence of such a through-opening across the blade improves significantly the flow of liquid into or out of the capsule by extending the section of the through-passage of liquid inwards in the blade about the boundaries of the opened capsule at the level of the blade. Such a through-opening however weakens the mechanical strength of the blade. This may become an issues over time, especially when harder capsules are used that are not easily pierced by the blade. Such an added constraint on the blade during piercing may of course lead to an early failure of the blade with the through-opening.

SUMMARY OF THE INVENTION

The invention relates to a system comprising a capsule and an extraction unit for extracting the capsule preferably with an improved fluid circulation into and/or out of the capsule.

In particular, the invention may relate to an ingredient capsule and an extraction unit for preparing a beverage from such ingredient and dispensing the beverage. For instance, the beverage is a coffee, tea, chocolate, cacao, milk or soup.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 200 ml or up to 300 or 400 ml, e.g. the volume for filling a cup or mug, depending on the type of beverage. Formed and dispensed beverages may be selected from ristrettos, espressos, lungos, cappuccinos, café latte, americano coffees, teas, etc. . . . . In particular, a coffee machine may be configured for dispensing espressos, e.g. an adjustable volume of 20 to 60 ml per serving, and/or for dispensing lungos, e.g. a volume in the range of 70 to 150 ml per serving.

Hence, the invention relates to a system comprising a capsule with a wall and a capsule extraction unit. The extraction unit has a capsule holder for holding the capsule and an opener for forming an opening in the capsule wall, in particular an opening having the shape of a straight or curved or angled slit. The opener comprises a cutting edge that forms the opening in the capsule wall by cutting thereof.

In accordance with the invention, the opener further comprises a ram that recesses a portion of the capsule wall adjacent to the opening after formation thereof by cutting the capsule wall by the cutting edge.

Hence, instead of narrowing the capsule piercing element at the level of the capsule wall when the piercing element has fully pierced the capsule and extends thereinto, the opener of the present invention includes an additional ram that is arranged to enlarge or allow the enlargement of the opening formed by the piercing element. Normally the ram does not itself cut (or significantly cut) the capsule wall but recesses this wall adjacent to the opening formed by the cutting edge to enlarge the opening or facilitate such an enlargement under the effect of a pressurised liquid circulated to the opening. Hence, circulation of liquid via the thereby enlarged opening is enhanced without weakening the opener.

The opener may be made of metal, such as steel or iron, or of ceramic or possibly hard polymeric material. The capsule wall to be opened by the opener should be made of a material that does not excessively wear the opener, such as plastic or aluminium. The capsule may also be made of biodegradable material.

The opener may have a blade that has a base supporting the cutting edge and the ram, the blade extending from a support member, e.g. a support plate. The support member can have one or more assembly arrangements, e.g. at least one assembly arrangement selected from an assembly hole, a notch and a protruding member such as a screw or rivet or a spring member e.g. a clip, for anchoring and/or positioning the support member in the capsule holder. Optionally, the assembly member(s) and the blade are at an angle and the capsule holder has a rib extending between the assembly member(s) and the blade into this angle, typically forming a notch in the opener. The blade and the support member and when present the assembly member(s) may be formed of a single bent plate. For instance, the blade and, when present, the assembly member is/are bent at an angle in the range of 75 to 105 deg, such as 85 to 95 deg, relative to the support member.

The cutting edge and the ram may be formed of a same plate member. Optionally, the plate member has a thickness that is tapered along the cutting edge to form a cutting ramp and in particular a non-tapered ram to form a ramming surface.

The entire opener or parts thereof (e.g. such a plate member) may be made of a thin plate, e.g. a sheet, of constant thickness, e.g. of less than 1 mm, typically a thickness in the range of 0.05 to 0.5 mm.

The plate member forming the cutting edge and the ram may have a constant thickness along the edge and the ram. For instance, the cutting edge has a cutting ramp that is at a cutting angle to a cutting direction of the opener and the ram has a ramming surface that is at a ramming angle to the cutting direction, the cutting angle being smaller than the ramming angle so that the cutting ramp is arranged to go through the capsule wall whereas the ramming surface is arranged to merely recess the capsule wall, optionally the cutting ramp being non-tapered.

The ram and the cutting edge may be at an angle, in particular at an angle in the range of 15 to 165 deg, such as 45 to 135 deg, optionally 60 to 120 deg, more particularly 80 to 100 deg.

The ram can extend from a bottom part of the cutting edge. Alternatively, the cutting edge and the ram may be spaced apart.

The ram may extend in the same plane as the cutting edge or in a different plane.

The cutting edge can have at least one cutting ramp, in particular a pair of generally straight non-collinear cutting ramps such as a pair of ramps in a v- or u-arrangement, for cutting in a cutting direction the capsule wall to form an opening extending along a generally straight cutting section.

The cutting edge may have in a cutting direction at least two non-coplanar cutting ramps for cutting the capsule wall to form an opening extending along: a first cutting section formed by the first ramp; and a second cutting section angled away from the first cutting section and formed by the second ramp.

The cutting edge may have at least one cutting ramp that cuts the capsule wall to form the opening. The ram can have at least one ramming surface that recesses the capsule wall for forming the recess, and wherein: the ramming surface has a shape extending generally in a continuity of the cutting ramp, optionally, the shapes of the ramming surface and of the cutting ramp being generally flush; or the ramming surface has a shape that is discontinuous from a shape of the cutting ramp, optionally the ram being spaced apart from the cutting edge (151).

The cutting edge may be arranged to form an opening having a first portion and a second portion intercepting in a non-collinear fashion the first portion. These portions delimit a weakened area of the capsule wall which is movable to facilitate a circulation of fluid at the opening. For instance, the weakened area is movable under the effect of the ram recessing the portion at least partly overlapping the weakened area. The weakened area of the capsule wall may generally form a U-shape or a V-shape or an L-shape. The weakened area may be moved by pressurised fluid circulated into the capsule holder.

In one embodiment, the opener comprises a plurality of spaced apart cutting edges for forming a plurality of spaced apart openings in one or more capsule walls by cutting thereof. Each cutting edge is associated with a corresponding ram that recesses a corresponding portion of the or each capsule wall associated with each opening after formation of the opening by cutting the wall by the corresponding cutting edge. Optionally, each cutting edge and associated ram is formed by a blade so that the opener has a plurality of spaced apart blades. The cutting edges may be generally tangentially arranged about a central axis of the opener and the rams may extend generally in a radial direction from this axis, or vice versa.

The invention also relates to an opener for a unit for extracting a capsule. The opener is arranged for forming an opening in a wall of such capsule, in particular an opening having the shape of a straight or curved or angled slit. The opener comprises a cutting edge that forms this opening by cutting. In accordance with the invention, this opener further comprises a ram for recessing a portion of the capsule wall adjacent to the opening after formation thereof by cutting this wall by the cutting edge. The opener may include any of the above opener-related features or a combination thereof.

The invention further relates to an extraction unit for extracting a capsule that has a wall. The unit comprises a capsule holder for holding the capsule and an opener as described above. Optionally, the capsule holder comprises a first part and a second part that are relatively movable from a capsule loading and/or ejection position to a capsule extraction position. The opener is assembled to the second part so that at least one of the cutting edge and the ram protrudes towards the first part. The extraction unit may include any of the above unit-related features or a combination thereof.

Another aspect of the invention relates to a use, for providing a system as described above, of a capsule, in which the capsule has a wall that is cut by the cutting edge of the opener for forming such opening, in particular an opening having the shape of a straight or curved or angled slit. The portion adjacent to the opening is recessed by the ram after formation of the opening by cutting the wall by the cutting edge.

The capsule may comprise a generally cylindrical or frusto-conical or domical or frusto-domical container. For instance, the container has an axis of symmetry such as an axis of revolution. The container has a bottom and a cover. The capsule wall forms part of the container. Optionally, the capsule wall extends from the bottom towards the cover. This wall may be generally cylindrical, frusto-conical, domical, frusto-domical or flat.

A further aspect of the invention relates to a use, for a capsule for the above described use, of at least one of coffee, tea, chocolate, milk, cocoa and soup constituents as an ingredient contained in the capsule.

BRIEF DESCRIPTION OF THE DRAWINGS

The invention will now be described with reference to the schematic drawings, wherein:

FIGS. 8 to 11b illustrate a capsule that is progressively opened by another capsule opener in accordance with the invention, in FIGS. 8a, 9a, 10a, 11a and 11b the capsule being shown with this opener.

DETAILED DESCRIPTION OF THE INVENTION

Figure 5:
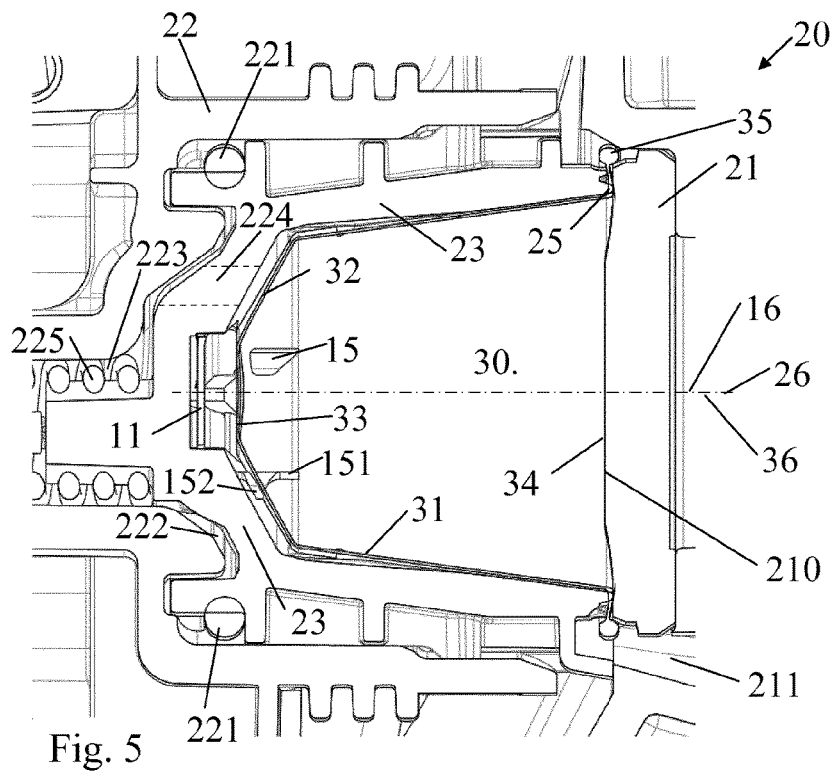
FIG. 5 illustrates a system formed by a capsule opened by an opener in an extraction unit in accordance with the invention.
Figure 6:
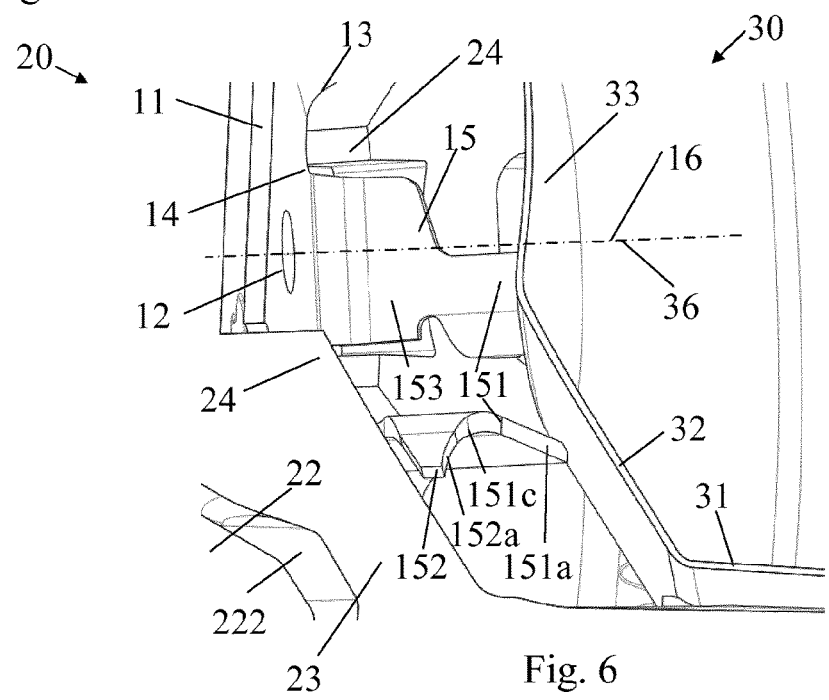
FIG. 6 illustrates a magnified view of part of the system of FIG. 5 before opening the capsule.

An example of a system according to the invention comprising a capsule 30 and a capsule extraction unit 10,20 is disclosed in FIGS. 5 and 6. An opener 10 of such an extraction unit is illustrated in FIGS. 1 to 4, a capsule 30 for such a system is disclosed in FIG. 7 and the opening of capsule 30 by an alternative opener 10 is illustrated in FIGS. 8 to 11b. Unless stated otherwise, the same references designate generally the same elements throughout the figures.

Figure 7:
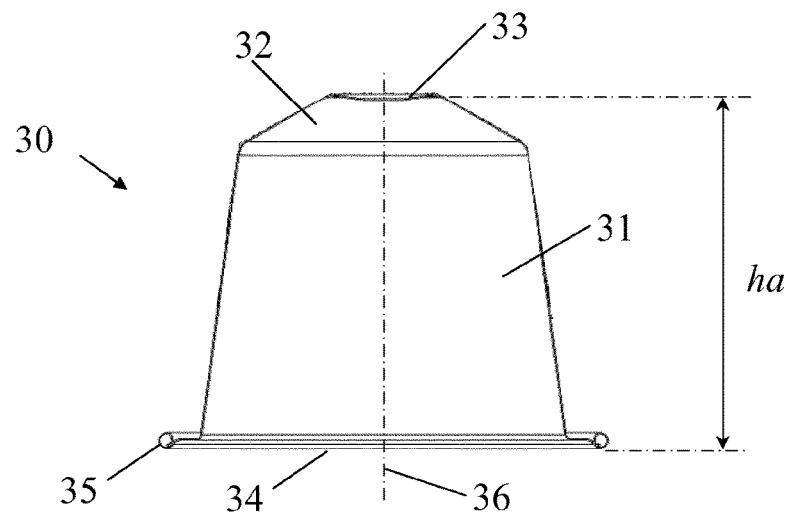
FIG. 7 shows a capsule for providing a system in accordance with the invention.

As illustrated in FIG. 7, capsule 30 of the system can have a cup-shaped receptacle 31 that has a generally cylindrical or frusto-conical or domical or frusto-domical shape, in particular a combination of different sections of such shapes. Typically, receptacle 31 has a frusto-conical obtuse bottom end 32,33 and a fruto-conical acute body extending from the bottom end towards the mouth of receptacle 31. Bottom end 32,33 may have a generally flat or slightly convex of concave bottom 33 and a peripheral wall 32. The mouth of receptacle 31 may be covered with a lid 34. The entire or only part of the lid may be applied to the receptacle; or the entire lid may be formed integrally with the receptacle. Such a lid, e.g. an aluminium or plastic foil, may extend laterally, typically beyond the mouth to form a flange 35. Capsule 30 may generally have a shape of revolution about a longitudinal axis 36. Other capsule shapes are also contemplated, in particular: the cartridge receptacle may be formed of a single section, e.g. (frusto-) conical, (frusto-)domical or cylindrical; the bottom may be generally flat or acute.

Receptacle 31 or at least wall 32 may be made of plastic, biodegradable or aluminium material. Lid 34 may be made of paper, plastic, biodegradable or aluminium material.

Capsule 30 typically contains an ingredient, e.g. a beverage ingredient such as coffee, tea, cocoa, milk, etc. . . . . For instance, capsule 30 has a volume for containing 3 to 10 g ground coffee for the preparation of a ristretto, an espresso, a lungo or an americano coffee.

As illustrated in FIGS. 1 to 6, extraction unit 10,20 has a capsule holder 20 for holding capsule 30 and an opener 10 for forming an opening 37,38 in a capsule wall 32. This opening may have the shape of a straight or curved or angled slit 37,38 (shown in FIGS. 10 and 11). Opener 10 comprises a cutting edge 151 that forms opening 37,38 in capsule wall 32 by cutting thereof.

In accordance with the invention, opener 10 further comprises a ram 152 that recesses a portion 39 of capsule wall 32 adjacent to opening 37,38 after formation thereof by cutting wall 32 by cutting edge 151. FIG. 6 illustrates a portion of capsule 30 in holder 20 shortly before opening and FIG. 5 shows capsule 30 once it has been opened by opener 10 in holder 20. The formation of opening 37,38 and recess 39 will be explained in greater details in relation with FIGS. 8 to 11b.

Holder 20 is arranged to hold capsule 30 for its extraction. Capsule holder 20 may comprise a first part 21 and a second part 22 that are relatively movable from a capsule loading and/or ejection position (not shown) to a capsule extraction position (as shown in FIG. 5).

First and second parts 21,22 may be relatively moved by a manual action, e.g. as disclosed in WO 2005/004683, WO 2007/135135, WO2007/135136 or WO 2009/043630, or by an automatic action in particular a motorized action, e.g. as disclosed in EP 1767129, WO 2012/025258, WO 2012/025259, or a hydraulic or mixed action e.g. as in WO 2011/042400.

First part 21 may have a face 210 facing lid 34 of capsule 30. Face 210 may include a fluid guiding arrangement from or to capsule 30, in particular for allowing an outflow of liquid from capsule 30 via lid 34. Face 210 may simply collect (or supply) fluid from capsule 30 into an outlet 211 or it may additionally be arranged to open lid 30, for instance by means of a lid opening means, e.g. pins or blades or pyramidal elements that penetrate lid 34, for instance as disclosed in EP 0 512 468 and EP 0 512 470.

Second part 22 may have a hydraulic sealing arrangement for sealing first and second parts 21,22 about flange 35 of capsule 30. The sealing arrangement can include a hydraulic piston member 23 that has a mouth 25. Piston member 23 may form a cage about capsule receptacle 31. Piston member 23 may be movably mounted in second part 22. A spring 225 may be provided to urge piston 23 and mouth 25 out of part 22 and against capsule flange 25 and first part 21. Liquid may be circulated into holder 20 via a conduit 223 in holder 22 about a rear part of piston 23 and toward capsule 30 via one or more passages 222,224. From passages 222,224, the liquid may circulate along blade 15 via openings 37,38 formed by opening edge 151 in capsule 30. To prevent that piston member 23 is urged apart from first part 21 under the effect of pressurized liquid flowing into holder 20, piston member 23 may be further urged against first part 21 by the action of the pressurized liquid inbetween parts 22 and 23. A seal 221 may be provided to seal off movable piston member 23 and second part 22. A hydraulic sealing system is disclosed in greater details for instance in EP 2 068 684.

Capsule 30 may be extracted by circulating a liquid therethrough to mix it with an ingredient contained in capsule 30, e.g. a flavouring ingredient such as tea, coffee, cocoa, milk . . . and produce a beverage.

The transfer of capsule 30 from its loading into holder 10,20 to its ejection from holder 10,20 via the extraction position is known, as for example disclosed in WO 2005/004683, WO 2009/043630 and WO 2012/025258.

Opener 10 may be assembled to second part 22 so that at least one of cutting edge 151 and ram 152 protrudes towards first part 21.

A central axis 16 of opener 10 may be substantially collinear with an axis 26 of second part 22, in particular of piston 23, and with a central axis 36 of capsule 30.

Optionally, cutting edge 151 is arranged to pierce capsule wall 32 in the direction of axis 16 during closure of holder 20 about capsule 30.

Extraction unit 10,20 may be mounted in a beverage preparation machine as known in the art, e.g. a machine provided with the functionalities disclosed in WO 2009/074550, such as a control unit, a user-interface, a fluid line, a pump, a temperature conditioner in particular a heater and/or a cooler, a water tank or other ingredient feeder, a waste ingredient collector, etc. . . . .

As illustrated in FIGS. 1 to 4, opener 10 may have a blade 15 that has a base 153 supporting cutting edge 151 and ram 152, blade 15 extending from a support member 11, in particular a support plate. Support member 11 can have one or more assembly arrangements, in particular at least one assembly arrangement selected from an assembly hole 12 (that may serve to screw or rivet opener 10 in holder 20), a notch 14 and a protruding member 13 such as a screw or rivet or a spring member e.g. a clip, for anchoring and/or positioning the support member in capsule holder 20. Optionally such protruding member(s) 13 and blade 15 is at an angle 14, capsule holder 20 having a rib 24 extending between the protruding member(s) and blade 15 into such angle 14. Blade 15 and support member 11 and when present protruding member(s) 13 are formed of a single bent plate.

For instance, blade 15 and when present assembly member 13 are bent at an angle in the range of 75 to 105 deg, such as 85 to 95 deg, relative to support member 11.

Figure 1:
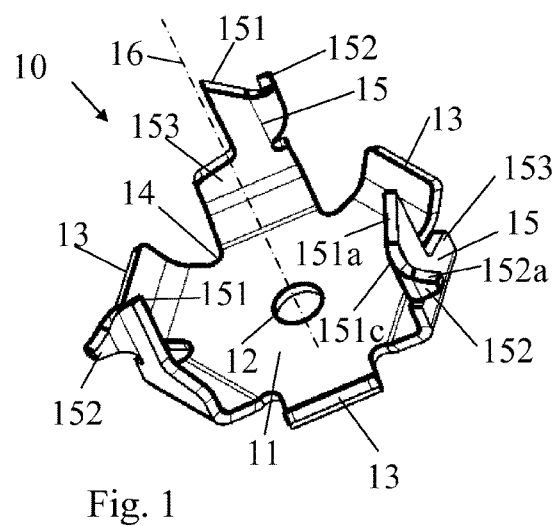
FIG. 1 is a perspective view of a capsule opener of a system according to the invention.
Figure 2:
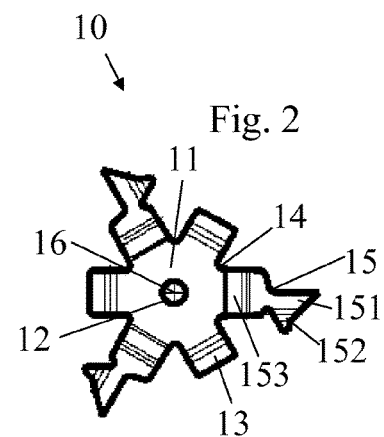
FIG. 2 is a plan view of a precursor of the capsule opener illustrated in FIG. 1.

As illustrated in FIG. 2, opener 10 may be made of a correspondingly cut metal sheet that is appropriately bent to form the abovementioned opener parts.

Cutting edge 151 and ram 152 may be formed of a same plate member. Optionally this plate member has a thickness that is tapered along the cutting edge 151 to form a cutting ramp 151a,151b,151c with improved cutting properties. Ram 152 normally has a non-tapered or non-significantly tapered ramming surface 152a. Of course, the manufacturing process, e.g. involving a cutting of the plate, may inherently deform to some extent the periphery of such plate. In such a case, the plate may additionally be tapered, e.g. along cutting edge 151.

The plate member forming cutting edge 151 and the ram 152 may have a generally constant thickness along edge 151 and ram 152. For example, cutting edge 151 has a cutting ramp 151a,151b,151c that is at a cutting angle to a cutting direction 16 of opener 10 and ram 152 has a ramming surface 152a that is at a ramming angle to cutting direction 16. In this example, the cutting angle can be smaller than the ramming angle so that cutting ramp 151a,151b,151c is arranged to go through capsule wall 32 whereas ramming surface 152a is arranged to merely recess the capsule wall (without significantly cutting it). Optionally, cutting ramp 151a,151b,151c is non-tapered.

By providing appropriate angles of cutting edge 151 and ram 152 relative to cutting direction 16, no particular machining, e.g. tapering, of the periphery of plate is necessary to obtain a cutting effect for edge 151 and a mere recessing effect of ram 152 in capsule wall 32. The thickness and the angles should of course be adjusted to the properties and orientation of capsule wall 32 so that when wall 32 and opener 10 are relatively urged together, wall 32 is first cut by cutting edge 151 and then recessed by ram 152.

Ram 152 and cutting edge 151 may be at an angle, in particular at an angle in the range of 15 to 165 deg, such as 45 to 135 deg, optionally 60 to 120 deg, more particularly 80 to 100 deg.

In cutting direction 16, ram 152 can extend from a bottom part of cutting edge 151.

Cutting edge 151 may have at least one cutting ramp 151a for cutting in cutting direction 16 capsule wall 32 to form an opening extending along a generally straight cutting section 37. As shown in the variation of FIGS. 8 to 11b, in which the same numeric references generally designate the same elements, a pair of generally straight non-collinear cutting ramps such as a pair of ramps 151a,151b in a v- or u-arrangement may be provided for cutting in cutting direction 16 capsule wall 32.

Cutting edge 151 may have in cutting direction 16 at least two non-coplanar cutting ramps 151a,151b;151c for cutting wall 32 to form an opening extending along:
- a first cutting section 37 formed by first ramp 151a,151b; and
- a second cutting section 38 angled away from first cutting section 38 and formed by second ramp 151c.

In the embodiment illustrated in FIGS. 1 to 4, cutting section 37 is formed by a single first ramp 151a. In the embodiment illustrated in FIGS. 8 to 11b, cutting section 37 is formed by a double ramp 151a,151b that extend in the same plane along cutting direction 16.

Figure 11:
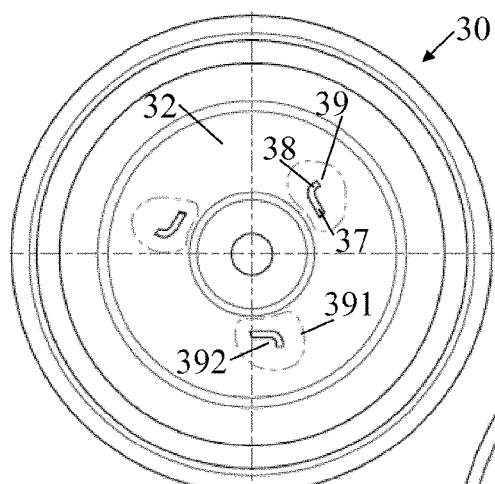
Figure 11A:
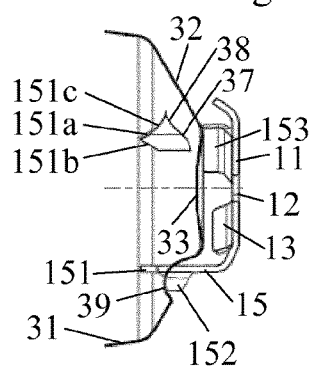
Figure 11B:
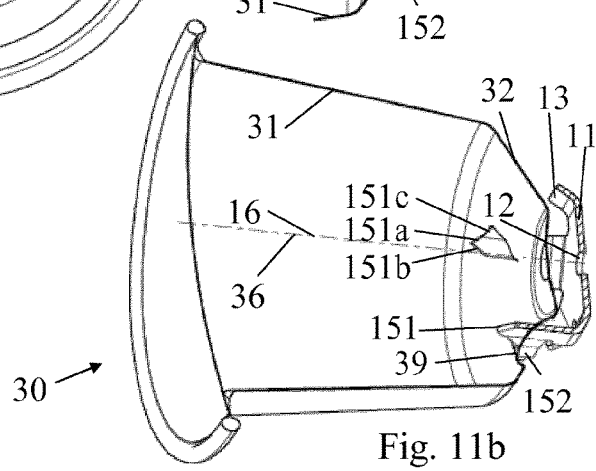

Cutting edge 151 can have at least one ramp 151a, 151b,151c that cuts capsule wall 32 to form opening 37,38, ram 152 having at least one ramming surface 152a that recesses wall 32 for forming recess 39 (delimited by dotted line 391 in FIG. 11). Ramming surface 152a may have a shape extending generally in a continuity (i.e. not significantly discontinuous or disruptive) of a shape of cutting ramp 151a,151b,151c, as illustrated in FIGS. 1 to 4 and 8 to 11b. Optionally, the shapes of ramming surface 152a and of cutting ramp 151a,151b,151c are generally flush. Hence, the action of cutting ramp 151 and ram 152 on capsule wall 32 progressively evolves from a cutting action to a mere recessing action.

Cutting ramp 151a,151b;151c can be arranged to form an opening having a first portion 37 and a second portion 38 intercepting in a non-collinear fashion first portion (forming an angle between first and second portions 37,38). Such portions 37,38 delimit therebetween a weakened area 392 of capsule wall 32 which is movable to facilitate a circulation of fluid at opening 37,38. Hence, opening 37,38 can be enlarged by moving weakened area 392 away, e.g. by bending area 392 generally along a line extending between the two outer extremities of portions 37,38. Weakened area 392 can be movable under the effect of ram 152 recessing portion 39 at least partly overlapping weakened area 392. Weakened area 392 of capsule wall 32 generally forms a U-shape or a V-shape or an L-shape between portions 37,38. Weakened area 392 can be moved by pressurized fluid circulated into holder 20.

As illustrated in FIGS. 1 to 4 and 8 to 11b, opener 10 may comprise a plurality of spaced apart cutting edge 151 for forming a plurality of spaced apart openings 37,38 in one or more capsule walls 32 by cutting thereof. Each cutting edge 151 can be associated with a corresponding ram 152 that recesses a corresponding portion 39 of the or each capsule wall 32 associated with each opening 37,38 after formation thereof by cutting capsule wall 32 by the corresponding cutting edge 151. Optionally each cutting edge 151 and associated ram 152 is formed by a blade 15 so that opener 10 has a plurality of spaced apart blades 15. Such an opener 10 having a plurality of blades 15 can be formed of a single plate, e.g. sheet, in particular of an appropriately bent plate. Blades 15 may be equally spaced apart along a periphery of opener 10. For instance, three blades 15 are provided on opener 10, the blades being spaced apart relative to one another by an angle of 120 deg, as illustrated in FIG. 2.

Figure 3:
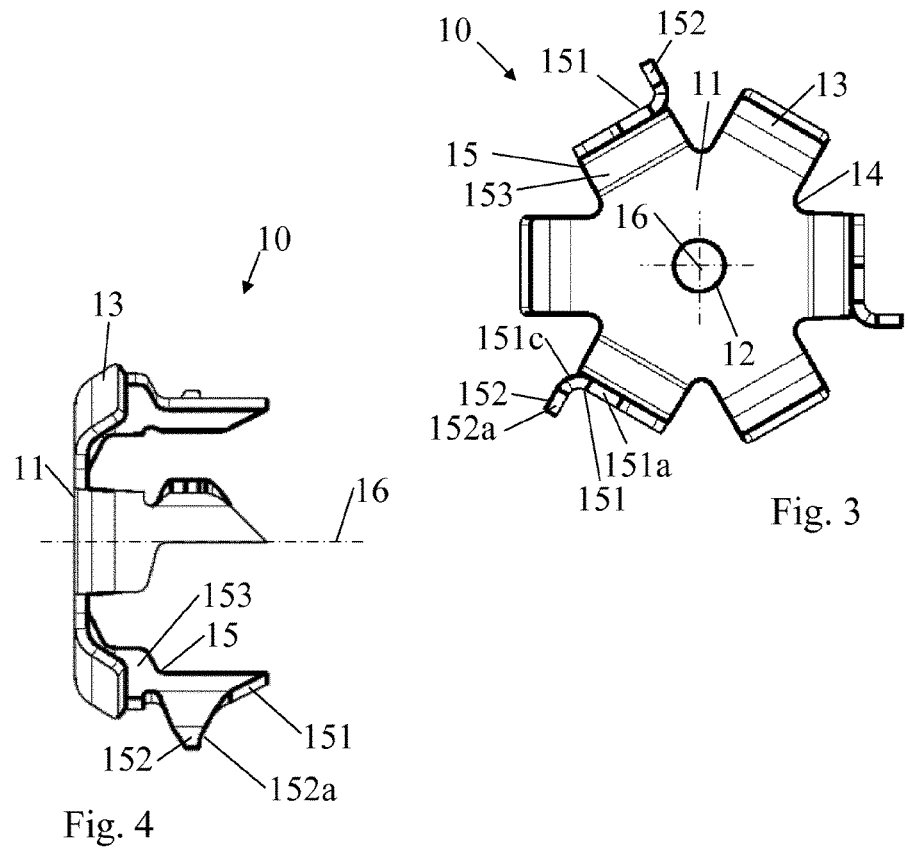
FIGS. 3 and 4 show from above and from the side the opener illustrated in FIG. 1.
Figure 4:
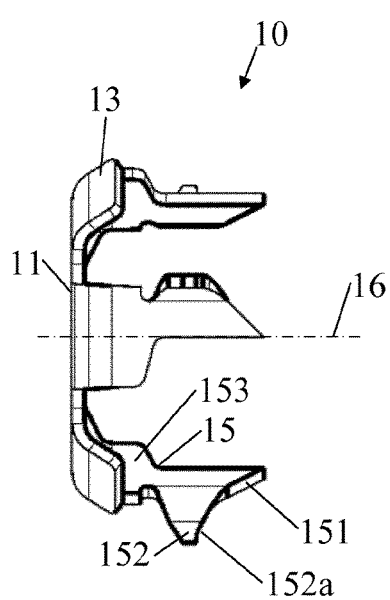

For example, cutting edges 151 are generally tangentially arranged about central axis 16 and rams 152 extend generally in a radial direction from central axis 16, as illustrated in FIG. 3, or vice versa.

Figures 12, 13:
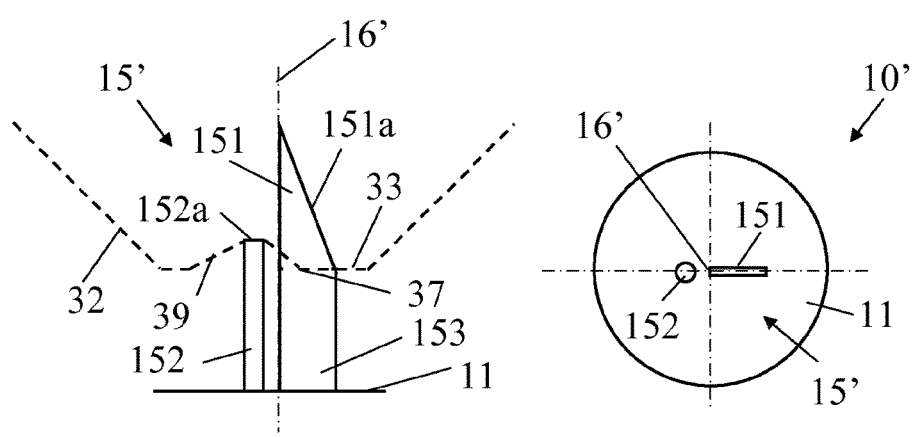
FIGS. 12 and 13 are a side view and view from above of another capsule opener in accordance with the invention.
Figure 10:
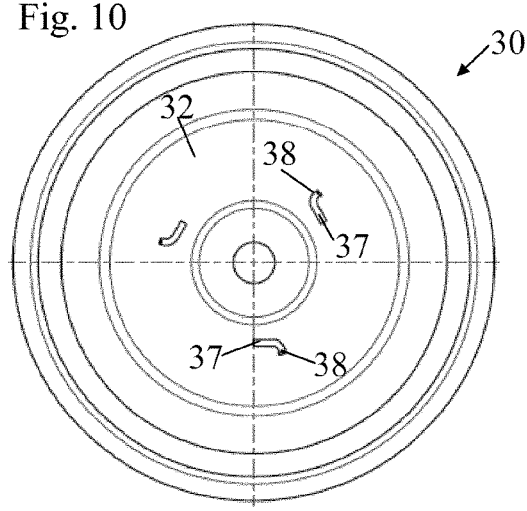
Figure 10A:
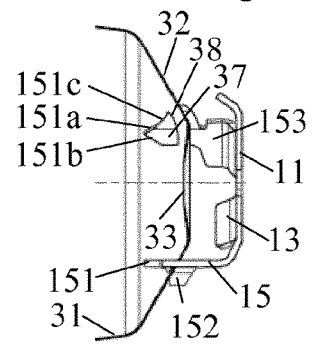

Opener 10' schematically illustrated in FIGS. 12 and 13, in which the same references generally designate the same elements, has an opening unit 15' that comprises a cutting edge 151 and a ram 152 spaced apart from edge 151. Ram 152 has a ramming surface 152a that recesses a portion 39 of a capsule wall 33 (schematically indicated in dotted lines) adjacent to opening 37 formed by cutting edge 151, in particular cutting ramp 151a. Unlike the previous embodiments, ram 15 is not juxtaposed to cutting edge 151. However, recess 39 formed by ram 15 in capsule wall 33 extends to the opening formed in wall 33 by cutting edge 151. In this particular embodiment, bottom 32 of the capsule is pierced.

In a variation, opener 10' could be arranged to pierce a peripheral wall 32 and/or include a plurality of cutting edges each associated with a corresponding ram or sharing a common ram, e.g. a central ram surrounded by a plurality of cutting edges.

Opening unit 15' is formed on a support member 11, e.g. a plate such as a circular plate, and extends therefrom in a cutting direction 16' of opener 10'. For example, support member 11 has a central axis 16' (e.g. generally perpendicular to member 11) and cutting edge 151 has a summit on axis 16' of member 11.

As in the previous embodiments, ram 152 is arranged to recess a portion of the capsule wall 33 adjacent opening 37 to force the opening and enlarge it (and/or allow its enlargement by the circulation of fluid under pressure thereon).

In a further embodiment, the cutting edge and ram of the embodiment of FIGS. 12 and 13 can be combined with a cutting edge and ram of the variety disclosed in the previous embodiments, e.g. as shown in FIGS. 1 to 4.

As opposed to prior art openers, the opener of the present inventions provides that when there is a uniform pressure rise over the capsule wall 32,33 under the effect of circulating pressurised liquid, a preferential circulation path is created along cutting edge 151 through enlarged and/or enlarging opening 37. This inhibits the mere crushing of capsule wall 32,33 and a resulting partial or total obstruction of opening 37. Thereby, capsules 30 can be properly extracted without interferences due to random crushing of the capsule under the effect of pressure.

The invention claimed is:

1. A system comprising:
   a capsule comprising a capsule wall; and
   a capsule extraction unit comprising a capsule holder configured to hold the capsule and an opener configured to form an opening in the capsule wall, the capsule holder comprising a first part and a second part that are relatively movable from a capsule loading and/or ejection position to a capsule extraction position, the second part is on an injection side relative to the capsule, and the opener comprises a blade and is fixed to the second part, the opener comprising a cutting edge configured to form the opening in the capsule wall by cutting the capsule wall, the opener further comprises a ram configured to form a recess in the capsule wall adjacent to the opening after formation of the opening by cutting the capsule wall by the cutting edge, the ram comprises a ramming surface that extends in a direction that is angled away from a plane extending from the cutting edge along a cutting direction.

2. The system of claim 1, wherein the blade has a base supporting the cutting edge and the ram, the blade extending from a support member.

3. The system of claim 2, wherein the support member has at least one assembly member.

4. The system of claim 3, wherein the blade, the support member and the at least one assembly member are formed of a single bent plate, the blade and the at least one assembly member being bent at an angle in a range of 75 to 105 degrees relative to the support member.

5. The system of claim 1, wherein the cutting edge and the ram are formed of a same plate member.

6. The system of claim 5, wherein the plate member forming the cutting edge and the ram has a constant thickness along the cutting edge and the ram, the cutting edge having a cutting ramp that is at a cutting angle to the cutting direction of the opener and the ram having a ramming surface that is at a ramming angle to the cutting direction, the cutting angle is smaller than the ramming angle, so that the cutting ramp is arranged to go through the capsule wall, whereas the ramming surface is arranged to merely recess the capsule wall.

7. The system of claim 1, wherein the cutting edge has at least one cutting ramp for cutting in the cutting direction the capsule wall to form the opening extending along a generally straight cutting section.

8. The system of claim 1, wherein the cutting edge has in the cutting direction at least two non-coplanar cutting ramps for cutting the capsule wall to form the opening extending along (i) a first cutting section formed by a first ramp and (ii) a second cutting section angled away from the first cutting section and formed by a second ramp.

9. The system of claim 1, wherein the cutting edge is arranged to form the opening having a first portion and a second portion intercepting in a non-collinear fashion the first portion, the first portion and the second portion define a weakened area of the capsule wall which is movable to facilitate a circulation of fluid at the opening, the weakened area being movable by the ram recessing a portion at least partly overlapping the weakened area.

10. The system of claim 9, wherein the weakened area of the capsule wall generally forms a shape selected from the group consisting of a U-shape, a V-shape and an L-shape.

11. The system of claim 9, wherein the weakened area is moved by pressurised fluid circulated into the capsule holder.

12. The system of claim 1, wherein the opener comprising a plurality of spaced apart cutting edges configured to form a plurality of spaced apart openings in one or more capsule walls by cutting the one or more capsule walls, each spaced apart cutting edge associated with a corresponding ram that recesses a corresponding portion of the capsule wall associated with a corresponding opening after formation of the corresponding opening by cutting the capsule wall by the corresponding spaced apart cutting edge.

13. The system of claim 12, wherein the plurality of spaced apart cutting edges are generally tangentially arranged about a central axis of the opener.

14. An opener for a unit for extracting a capsule and arranged for forming an opening in a wall of the capsule, the opener comprising:
a cutting edge configured to form the opening in the wall by cutting the wall; and
a ram configured to form a recess in the wall adjacent to the opening after formation of the opening by cutting the wall by the cutting edge, the ram comprises a ramming surface that extends in a direction that is angled away from a plane extending from the cutting edge along a cutting direction, the ram extending from a bottom part of the cutting edge at an angle in a range of 15 to 165 degrees relative to the bottom part of the cutting edge,
the opener comprises a blade and is fixed to a second part of a capsule holder, the capsule holder configured to hold the capsule and comprising a first part and the second part that are relatively movable from a capsule loading and/or ejection position to a capsule extraction position, and the second part is on an injection side relative to the capsule.

15. An extraction unit for extracting a capsule that has a wall, the extraction unit comprising:
a capsule holder for holding the capsule, the capsule holder comprising a first part and a second part that are relatively movable from a capsule loading and/or ejection position to a capsule extraction position, the second part is on an injection side relative to the capsule; and
an opener comprising a cutting edge and a ram, the opener fixed to the second part, so that at least one of the cutting edge and the ram protrudes towards the first part, the cutting edge is configured to form an opening in the wall of the capsule by cutting the wall, and the ram is configured to form a recess in the capsule wall adjacent to the opening, the ram comprises a ramming surface that extends in a direction that is angled away from a plane extending from the cutting edge along a cutting direction.

16. A method for opening a capsule that has a capsule wall, the method comprising:
cutting the capsule wall using a cutting edge of an opener for forming an opening; and
forming a recess in the capsule wall adjacent to the opening by a ram of the opener after formation of the opening, the ram comprises a ramming surface that extends in a direction that is angled away from a plane extending from the cutting edge along a cutting direction.

17. The method according to claim 16, wherein the capsule comprises a container having a general shape selected from the group consisting of cylindrical, frusto-conical, domical, and frusto-domical, the container having a bottom and a cover, and the capsule wall forming part of the container.

18. The method according to claim 16, wherein the capsule wall has a shape selected from the group consisting of cylindrical, frusto-conical, domical, frusto-domical and flat.

19. The method according to claim 16, wherein the capsule contains an ingredient selected from the group consisting of coffee, tea, chocolate, milk, soup constituents, and combinations thereof.

20. The system of claim 1, wherein the cutting edge comprises at least one cutting ramp that cuts the capsule wall to form the opening, the ram has at least one ramming surface that recesses the capsule wall for forming the recess, and the ramming surface has a structure selected from the group consisting of (1) a shape extending generally in a continuity of a shape of the at least one cutting ramp and (2) a shape that is discontinuous from the shape of the at least one cutting ramp.

21. A system comprising:
a capsule comprising a capsule wall; and
a capsule extraction unit comprising a capsule holder configured to hold the capsule and an opener configured to form an opening in the capsule wall, the capsule holder comprising a first part and a second part that are relatively movable from a capsule loading and/or ejection position to a capsule extraction position, the second part is on an injection side relative to the capsule, and the opener comprises a blade and is fixed to the second part, the opener comprising a cutting edge configured to form the opening in the capsule wall by cutting the capsule wall, the opener further comprises a ram configured to form a recess in the capsule wall adjacent to the opening after formation of the opening by cutting the capsule wall by the cutting edge, wherein the blade comprises a base supporting the ram and the cutting edge, the base defines a first vertical plane, the ram defines a second vertical plane, and the second vertical plane is positioned at an angle of 15 to 165 degrees relative to the first vertical plane.

22. The system of claim 6, wherein the cutting ramp is non-tapered.

* * * * *